United States Patent
Ramasamy

(10) Patent No.: US 9,483,248 B2
(45) Date of Patent: Nov. 1, 2016

(54) AUTOMATIC GENERATION AND EXECUTION OF SERVER UPDATE PROCESSES

(71) Applicant: Oracle International Corporation, Redwood Shores, CA (US)

(72) Inventor: Karthikeyan Ramasamy, Palani (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/332,205

(22) Filed: Jul. 15, 2014

(65) Prior Publication Data

US 2016/0019043 A1    Jan. 21, 2016

(51) Int. Cl.
   *G06F 9/445* (2006.01)

(52) U.S. Cl.
   CPC . *G06F 8/65* (2013.01); *G06F 8/67* (2013.01); *G06F 8/61* (2013.01)

(58) Field of Classification Search
   None
   See application file for complete search history.

(56) References Cited

U.S. PATENT DOCUMENTS

| | | | | |
|---|---|---|---|---|
| 6,161,218 A * | 12/2000 | Taylor | | 717/174 |
| 6,751,794 B1 * | 6/2004 | McCaleb et al. | | 717/168 |
| 6,912,711 B1 * | 6/2005 | Curtis et al. | | 717/173 |
| 8,930,937 B2 * | 1/2015 | McCaleb et al. | | 717/172 |
| 8,954,949 B2 * | 2/2015 | Bhat et al. | | 717/169 |
| 2004/0015938 A1 * | 1/2004 | Taylor | | 717/168 |
| 2004/0205709 A1 * | 10/2004 | Hiltgen et al. | | 717/115 |
| 2005/0257208 A1 * | 11/2005 | Blumfield et al. | | 717/168 |
| 2006/0080656 A1 * | 4/2006 | Cain et al. | | 717/174 |
| 2008/0163192 A1 * | 7/2008 | Jha et al. | | 717/173 |
| 2008/0168434 A1 * | 7/2008 | Gee et al. | | 717/173 |
| 2009/0089119 A1 * | 4/2009 | Ranjan | | 705/7 |
| 2009/0106748 A1 * | 4/2009 | Chess et al. | | 717/168 |
| 2009/0183150 A1 * | 7/2009 | Felts | | 717/173 |
| 2009/0222811 A1 * | 9/2009 | Faus et al. | | 717/173 |
| 2010/0088693 A1 * | 4/2010 | Vulugundam | | 717/173 |
| 2011/0138185 A1 * | 6/2011 | Ju et al. | | 713/171 |
| 2011/0265076 A1 * | 10/2011 | Thorat et al. | | 717/172 |
| 2013/0198745 A1 * | 8/2013 | De et al. | | 718/1 |
| 2013/0263104 A1 * | 10/2013 | Baset et al. | | 717/168 |
| 2014/0237464 A1 * | 8/2014 | Waterman et al. | | 717/172 |
| 2014/0372799 A1 * | 12/2014 | Wei | | 714/19 |
| 2015/0074659 A1 * | 3/2015 | Madsen et al. | | 717/177 |

* cited by examiner

*Primary Examiner* — Isaac T Tecklu
(74) *Attorney, Agent, or Firm* — Kilpatrick Townsend & Stockton LLP

(57) ABSTRACT

A method of updating a plurality of servers may include receiving a plurality of patch requests, receiving a selection of a computing environment from a plurality of computing environments, and selecting patch requests from the plurality of patch requests that are associated with the selected computing environment. The method may also include accessing a configuration for the selected computing environment, and generating patch command scripts for each of the selected patch requests. The patch command scripts may be generated based on the configuration of the selected computing environment and a respective selected patch request. The method may additionally include executing each of the patch command scripts to update the plurality of servers.

20 Claims, 14 Drawing Sheets

```xml
<?xml version="1.0" encoding="windows-1252" ?>
<xml>
<uploaddir>/slot/ems5246/appmgr/WLS/user_projects/domains/wls_app5246/servers/AdminServer/upload/</uploaddir>

<!--Define application-1 individually-->
<application Id="1" Name="HcmCoresetup">
<!--Application attributes-->
<jarTypes>HcmCoreSetupUI, HcmCoreSetupModel</jarTypes>
<jarPaths>
/slot/ems5246/appmgr/WLS/user_projects/domains/wls_app5246/servers/AdminServer/upload/HcmCoreSetupApp/app/HcmCoreSetupApp/EarHcmCoreSetup.war/WEB-INF/lib,/slot/ems5246/appmgr/WLS/user_projects/domains/wls_app5246/servers/AdminServer/upload/HcmCoreSetupApp/app/HcmCoreSetupApp/APP-INF/lib/</jarPaths>
<backup Path>
/slot/ems5246/appmgr/WLS/user_projects/domains/wls_app5246/servers/AdminServer/upload/temp/,/slot/ems5246/appmgr/WLS/user_projects/domains/wls_app5246/servers/AdminServer/upload/temp/</backupPath>
</application>

<!--Define application-2 individually-->
<application Id="2" Name="HcmCore">
<!--Application attributes-->
<jarTypes>HcmCoreUI, HcmCoreModel</jarTypes>
<jarPaths>
/slot/ems5246/appmgr/WLS/user_projects/domains/wls_app5246/appmgr/WLS/use_projects/domains/wls_app5246/servers/AdminServer/uploads....
EarHcmCore.war/WEB-INF/lib,/slot/ems5246/appmgr/WLS/user_projects/domains/wls_app5246/servers/AdminServer/uploads....
```

Patching Tool -- Execute

- Requested by: jstockton@utjazz.hof.com  Jan 31, 10:50 PM MST
- JAR: PersonInterfaceService.jar
- Same JARs in environment: ../HcmAnalyticsApp/app/APP-INF/lib/AdfHcmInterfaceService.jar
  ../HcmCoreTTY/bin/cygnus/users/PersonInterface.jar  *(1004)*
- Source JAR file: /view_storage/hom/components/PersonInterfaceService.jar
- Test access to source JAR path: [Check access to source path]  *(1002)*
- JAR type label: FndSetupApp-Model
- Bug No.: 17765030
- Backup path: /slot/ems11114/appmgr/VVL/user_projects/domians/wfs_app11114/
  servers/AdminServer/upload/temp/bug17765030
- Enable additional destinations: ☑ Select to add multiple destinations
- Enable manual path entry: ☐ Enter user-defined path
- Confirm paths: ☐ I have verified the .jar, environment, and destination paths
- Destination JAR path(s): /slot/ems11114/appmgr/WLs/user_projects/domians/wfs_app11114/
  servers/AdminServer/upload/HcmCoreSetupApp/app/HcmCoreSetupApp/
  APP-INF/lib/slot/ems11114/appmgr/WLS/user_projects/domians/wfs_app  *(1006)*
- Click to patch the JAR: [Backup and Patch]  *(1008)*

[Exit]  [Prev]  [Next]  Click "Next" to patch the next JAR  *(1010)*

*(1000)*

AUTOMATIC GENERATION AND EXECUTION OF SERVER UPDATE PROCESSES

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Many modern software systems operate in environments with very high usage, often serving millions of users simultaneously. Many of these environments may be utilized by customers across the globe. As bugs are discovered and as new products and services are offered, each environment may include applications that require update operations to be processed on a regular—even daily—basis. This can involve updating software modules, replacing software modules, and bouncing (turning off and on) servers. Because of the frequency of the update process, along with the complexity of coordinating patches with the correct applications, operating environments, and backup routines, this constant update process is fraught with errors and inefficiencies.

BRIEF SUMMARY

In one embodiment, a method of updating a plurality of servers may be presented. The method may include receiving a plurality of patch requests, receiving a selection of a computing environment from a plurality of computing environments, and selecting patch requests from the plurality of patch requests that are associated with the selected computing environment. The method may also include accessing a configuration for the selected computing environment, and generating patch command scripts for each of the selected patch requests. The patch command scripts may be generated based on the configuration of the selected computing environment and a respective selected patch request. The method may additionally include executing each of the patch command scripts to update the plurality of servers.

In another embodiment, a non-transitory computer-readable medium may be presented. The computer-readable memory may comprise a sequence of instructions which, when executed by one or more processors, causes the one or more processors to perform operations including receiving a selection of a computing environment from a plurality of computing environments, and selecting patch requests from the plurality of patch requests that are associated with the selected computing environment. The operations may also include accessing a configuration for the selected computing environment, and generating patch command scripts for each of the selected patch requests. The patch command scripts may be generated based on the configuration of the selected computing environment and a respective selected patch request. The operations may additionally include executing each of the patch command scripts to update the plurality of servers.

In yet another embodiment, a system may be presented. The system may include one or more processors and a memory communicatively coupled with and readable by the one or more processors. The memory may comprise a sequence of instructions which, when executed by the one or more processors, causes the one or more processors to perform operations including receiving a selection of a computing environment from a plurality of computing environments, and selecting patch requests from the plurality of patch requests that are associated with the selected computing environment. The operations may also include accessing a configuration for the selected computing environment, and generating patch command scripts for each of the selected patch requests. The patch command scripts may be generated based on the configuration of the selected computing environment and a respective selected patch request. The operations may additionally include executing each of the patch command scripts to update the plurality of servers.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates one example of a computing environment configuration, according to one embodiment.

FIG. 10 illustrates an interface for generating command scripts and executing patch processes, according to one embodiment.

DETAILED DESCRIPTION

Described herein, are embodiments for automating the patching process for selected computing environments. Software developers are able to design patches and respond to bug-fix requests. Developers can upload an indication of these patches to a central patch collecting environment, such as a webpage. An automated tool can allow a system administrator to select a computing environment, such as web services, standalone applications, database tools, and/or the like. The tool can then automatically select any available patches that apply to that computing environment. Each computing environment can be associated with a configuration file that, among other things, includes paths for backup directories, and/or patch install locations. The tool can use the configuration of the computing environment as well as the patch request itself to automatically generate command scripts to execute the patch processes. When the tool executes the patch command scripts, existing software modules can be swapped out for new software modules, the old software modules can be stored in a backup location that is date-indexed, and a record log may be kept that details the actions taken during the patch process.

Some environments may be subject to very high usage and may be accessed by users scattered across the globe. These computing environments may run applications designed in many different development centers. Therefore, patching software applications in a single environment may involve applying patches from many different locations and/or development groups. For a single application, the patching process may include determining a location where the updated software module for the patches is stored, determining which existing software modules should be replaced/updated, where the existing software modules are located, where and how backup copies of the existing software modules should be stored, how log file should be kept, and when the server should be brought off-line to install the patch. As a manual process, patching even a single application can be very time intensive and mistake prone. Therefore, the embodiments described herein automate this process by providing a central location for cash requests to be uploaded, automatically determining when, where, and/or how each cash should be installed, and automatically generating and executing command scripts for installing selected patches.

Figure 1:
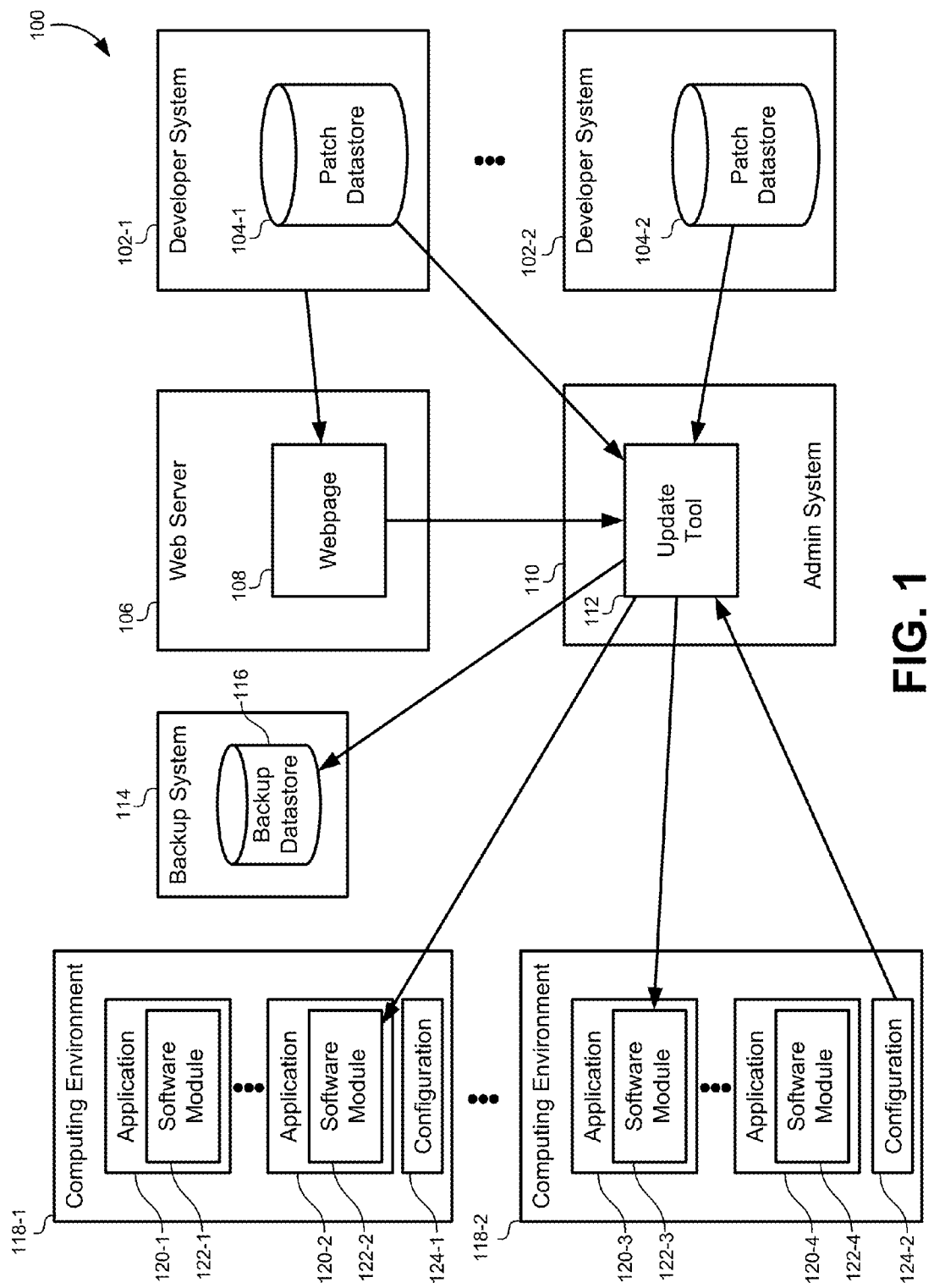
FIG. 1 illustrates a block diagram of a system for automatically applying patches to a computing environment, according to one embodiment.

FIG. 1 illustrates a block diagram 100 of a system for automatically applying patches to a computing environment, according to one embodiment. Applications 120 can be deployed to computing environments 118 throughout an Enterprise. Each of the applications 120 may be designed and distributed from different developer systems 102. A developer system 102 may be a development environment, or development group where a particular type of application is designed and/or distributed. For example, distributor system 102-1 may be located within a employment group dedicated to developing web services for interaction with human resource databases.

After the applications 120 are deployed to the computing environments 118, Information Technology (IT) systems for the various computing environments 118 may receive complaints or bug reports from users. Typically, IT professionals will generate a bug report, trouble ticket, and/or the like, that is eventually sent to the developer system 102 from which the application generating the error originated. As the developer systems 102 receive indications of bugs in the applications 120, the developer systems 102 may generate patches that correct the errors in the applications 120. Patches may be developed internal to each developer system 102 and may be stored in any sort of software code repository, referred to herein generically as a patch datastore 104.

A system administrator may interact with an admin system 110 to apply patches to the corresponding applications in various computing environments 118. Prior to this invention, this was a manual process, and the system administrator would have to manually login to each system, locate the correct patch, locate each of the software modules affected by the patch, backup each application, apply the patch to each application, and create a log file detailing the patch procedure. In contrast, the embodiments described herein provide for an update tool 112 that can automatically perform each step in the patching procedure with minimal administrator involvement.

In response to a trouble ticket or bug report, a software developer can produce a patch responsive to the trouble ticket or bug report. Using the developer system 102-1, the developer can store the patch locally in a patch datastore 104-1. In order to make the patch publicly available, the developer system 102-1 can send an indication to a computer system that is accessible by the admin system 110. For example, the developer system 102-1 can send an indication to a webpage 108 operating on a web server 106. The webpage 108 can include an HTML/XML table that can be dynamically updated by various developer systems 102 as patches become available. The developer system 102-1 can provide any information that would be required to apply the patch, such as a location of the patch (a path) in the patch datastore 104-1, a type of computing environment, a type of application, a type of software module, etc. The webpage 108 may then be accessible to the update tool 112. Note that in some embodiments, the admin system 110 and/or the update tool 112 may directly receive indications from the developer systems 102 when patches are ready.

It will be understood that the update tool 112 is not dependent on any application server or environment, including the admin system 110. The update tool 112 can be a stand-alone tool that can connect with the application servers, domains, and/or computing environments to perform the process of patching, bouncing servers, checking server statuses, backing up existing software modules, and/or the like. As a stand-alone application, the update tool 112 can operate as an OS-level file process for replacing executable files. The particular location of the update to 112 in FIG. 1 is merely exemplary and not meant to be limiting. For example, the update tool 112 can be implemented as a web application. The features attributed herein to the update tool 112 can be available in a web interface that is hosted as a web application. This environment may be particularly advantageous when an Enterprise has a group of system administrators with a large number of computing environments to the patch. By implementing the update tool 112 as a web application, all the configurations for the computing environments (discussed further below) can be stored in a single location, and access can be restricted to system administrators. Typically, the operating details of the update tool 112 as described below can remain the same, the only difference being the way in which the update tool 112 is hosted.

In the embodiment of FIG. 1, the update tool 112 may periodically query the webpage 108 to extract a list of patches that are ready for installation from the developer systems 102. The webpage 108 may return a plurality of patch requests. As used herein, the term "patch request" may broadly referred to an indication that a patch is available, along with any information that would be considered useful for installing the patch. Because some applications 120 may operate in multiple different computing environments 118 the update tool 112 may receive a selection of a particular computing environment 118. The selection may be received from a human system administrator, or may be generated automatically by the update tool 112. For example, for a particular patch, the update tool 112 may cycle through any applicable computing environments 118 until the patch is installed throughout the enterprise.

After selecting a computing environment 118-1, the update tool 112 can analyze the plurality of patch requests received from the webpage 108 and select patches that are applicable to the computing environment 118-1. For example, if a web services computing environment for a human resource management system is selected as the computing environment 118-1, then the update tool 112 can select any patch requests available via the webpage 106 that would apply to applications running in the selected computing environment.

For each of the selected patches that are applicable to the computing environment 118-1, the update tool 112 can generate a patch command script. As used herein, the term "patch command script" should be broadly interpreted to mean any sequence of commands that will automatically carry out the patching operation in the selected computing environment 118-1. For example, a patch command script may be a sequence of command commands that can be entered into the command line of an operating system shell or virtual machine for execution. Further examples of patch command scripts will be discussed further below.

In order to generate the patch command scripts, the update tool 112 may access information that is specific to the computing environment 118-1. Any information specific to the computing environment 118-1 may be referred to as a configuration 124-1 for the computing environment 118-1. The configuration 124-1 made generally be stored in a configuration file that can be accessed by the update tool 112. The configuration file may include, among many things, logical paths for each application 120 and/or software module 122 operating in the computing environment 118. The configuration 124 may also include information describing backup procedures and/or a location for a backup system 114 that may include a backup datastore 112. These logical paths may be used to generate the patch command scripts for each of the patches.

As used herein, the term "patch" may include any information and/or code that is used to update an application 120. In some embodiments, a patch may be a software module that can simply be used to replace an existing software module 122. For example, a new .JAR file may be used to replace an existing .JAR file in a Java application. In some embodiments, a patch may include a plurality of software modules to be replaced, configuration files for applications that need to be updated, and/or the like. In addition to using information from the configuration 124 (such as destination and backup paths), the patch command scripts can be generated based on the corresponding patch request itself, and may include information such as a patch location, and any other patch instructions associated with the patch request.

When executing the patch command scripts, the update tool 112 may first store a backup of a particular software module 122-2 before replacing it with a new software module specified by the patch. The particular software module 122-2 could be stored in the backup data store 116 specified by the configuration 124-1. The update tool 112 may also store a log file that records each operation executed as a result of the patch command script.

Figure 2:
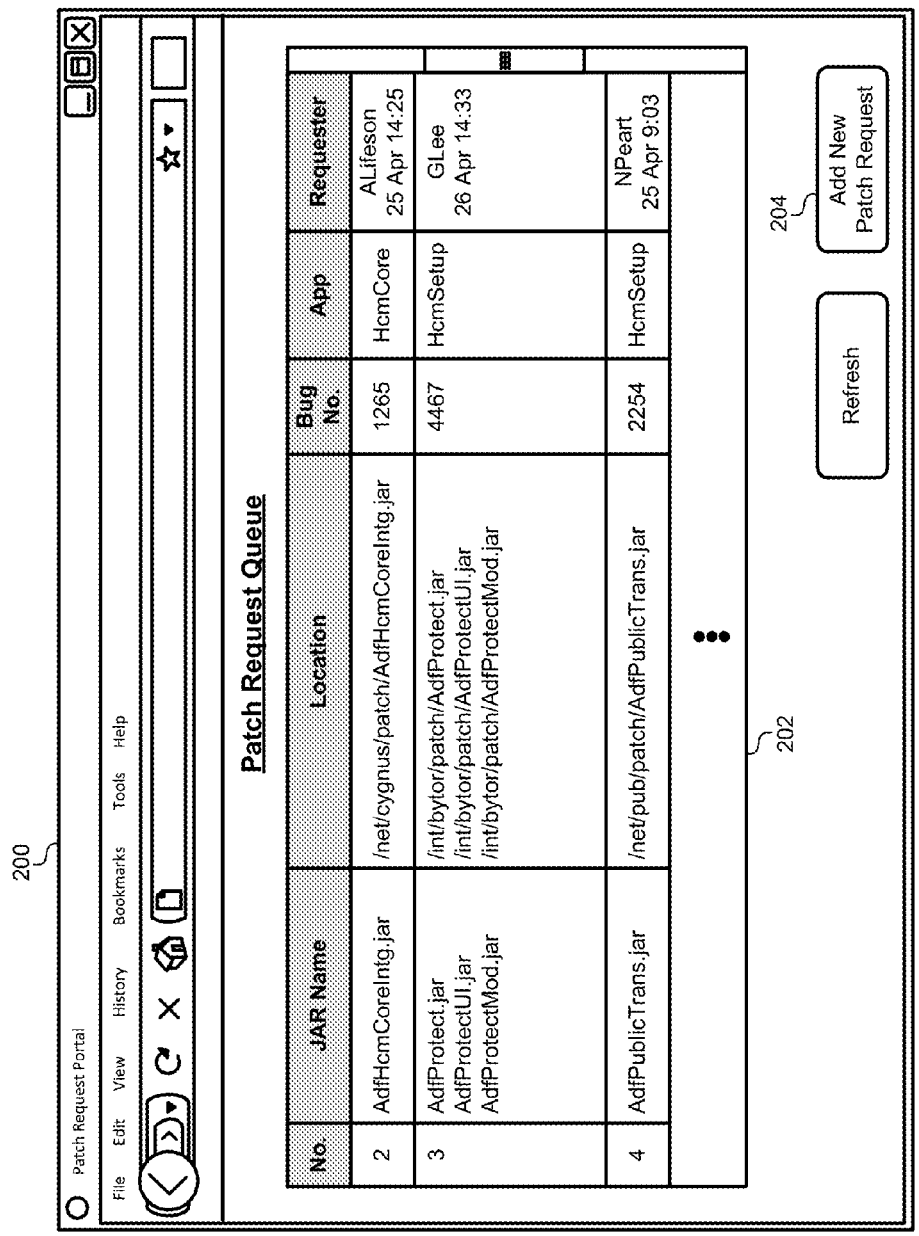
FIG. 2 illustrates an interface for requesting and managing patch requests, according to one embodiment.

FIG. 2 illustrates an interface 200 for requesting and managing patch requests, according to one embodiment. The purpose of interface 200 is to receive new patch requests from developers that can be applied by the update tool in the appropriate computing environments. In some embodiments, the update tool can connect to a webpage or wiki page that includes interface 200 and parse the patch requests. The web server hosting interface 200 may include a datastore on the backend that includes XML records for each patch request such that when connecting to interface 200, the update tool can read the XML records, or a user can manually select particular patch requests that are applicable to a particular computing environment. Generally, the update tool can parse the patch request records stored by the backend and select those that are related to a specific computing environment.

Each patch request may include a number of different data fields that may be of interest in applying the patch. For example, the patch request may include a software module name, such as a .JAR name. The patch request may also include a unique identifier for the patch request and the location (path) of the software module used in the patch process. The patch request may be linked to an IT ticket by ticket number or bug number. In some embodiments, after the patch process is complete for a particular patch request, the update tool can communicate with an IT system to resolve the particular ticket number or bug number. Additionally, each patch request may include a name of an application and/or a name of a particular computing environment to which the patch should be applied. Some embodiments may also include a timestamp and/or a user identifier for a developer associated with the patch.

When patches are available, developers can add a new patch request 204 to interface 200. New patch requests can be added to a data table 202 and can be represented internally at the backend and/or displayed as part of interface 200. Interface 200 can provide a means for system administrator or patch developer to quickly assess the overall number of patches awaiting execution and/or the progress of any one individual patch.

Figure 3:
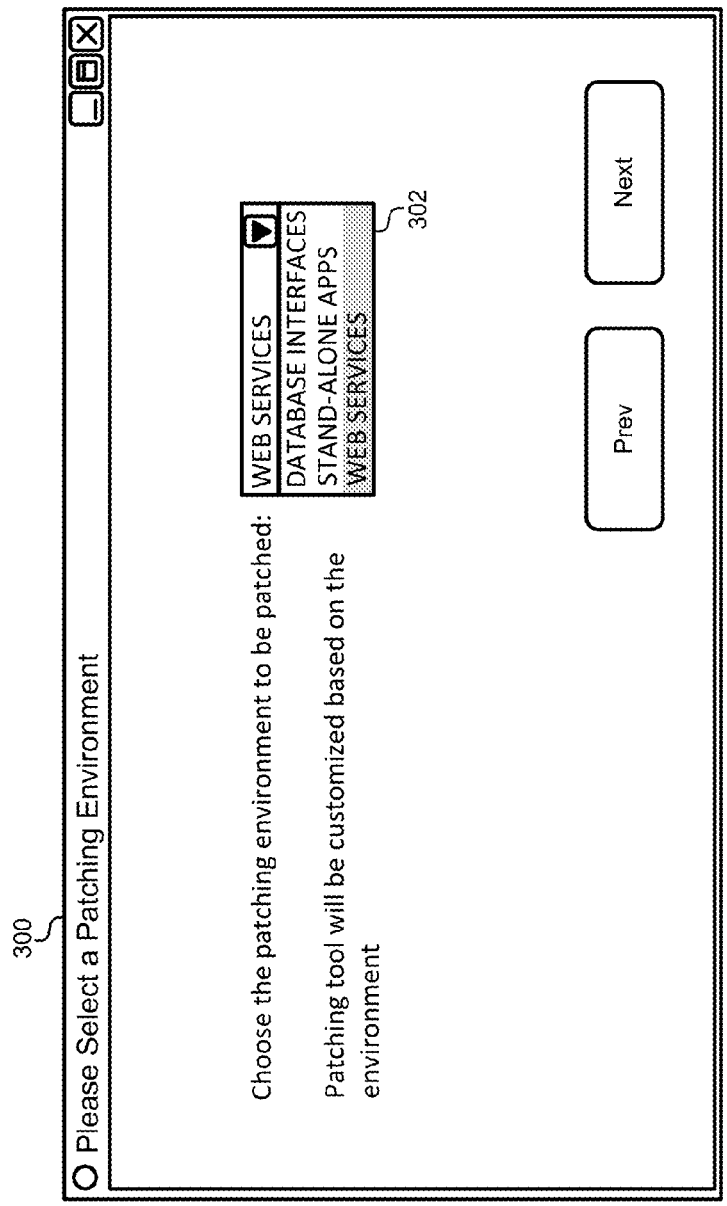
FIG. 3 illustrates an interface for selecting among a plurality of computing environments, according to one embodiment.

FIG. 3 illustrates an interface 300 for selecting among a plurality of computing environments, according to one embodiment. As described above, some patches can be specific to particular computing environments. Additionally, it may be more efficient for the update tool to log into a single computing environment (e.g. a web services server) and apply all patches that apply that computing environment as opposed to selecting a single patch and logging into multiple computing environments to apply a single patch. Interface 300 provides a control 302 for first determining what computing environments are available, and then for selecting a particular computing environment from amongst the plurality of available computing environments. In some embodiments, selecting the computing environment may cause the update tool to automatically login to the selected computing environment using credentials provided by the system administrator as described below.

In some embodiments, selecting a particular computing environment can also select a corresponding configuration for the computing environment. For example, a corresponding XML data file can be accessed based on the computing environment selection. The XML data file can then be used to customize the remaining steps executed by the update tool based on the computing environment data required for patching.

FIG. 4 illustrates one example of a computing environment configuration 400, according to one embodiment. In this embodiment, configuration 400 is represented by an XML data file as described above. A configuration may include a number of different data fields that may be used by the patching process. For example, the configuration 400 includes a label that identifies a first application ("Hcm-CoreSetup") operating within the computing environment. The configuration also includes a list 404 of software modules (e.g. JAR files/types) operating as part of the particular application. Of particular interest for the patching process, is also a list 406 of paths that lead to the software modules that may be part of the patching process. The computing environment may also include a backup path that indicates where a backup of the existing software modules should be stored prior to their replacement by a new software module.

Typically, a configuration 400 will include a number of different application data structures within the XML data file. By way of example, configuration 400 includes application 1 described above, as well as application 2 described in code block 410. It will be understood that additional applications may also be indicated within configuration 400; however, these have been omitted from FIG. 4 for brevity and clarity.

Figure 5:
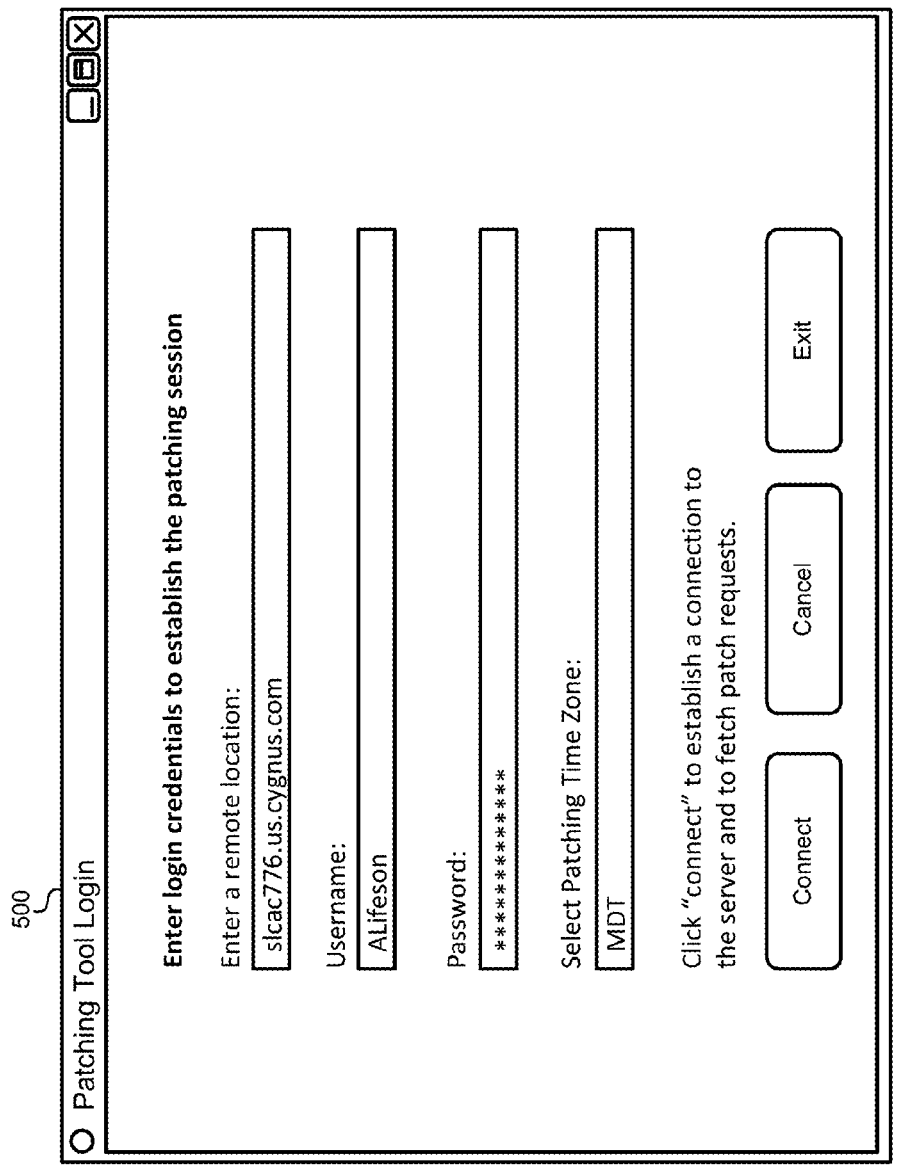
FIG. 5 illustrates an interface for accepting and applying login credentials, according to one embodiment.

FIG. 5 illustrates an interface 500 for accepting and applying login credentials, according to one embodiment. One of the problems with the manual patching process that existed prior to this disclosure is that the system administrator needed to log into a plurality of different systems. Turning back briefly to FIG. 1, a system administrator would need to log into at least the admin system 110, the developer system 102-1, the web server 106, and/or the computing environment 118-1. Each of these different systems may require different login credentials and/or procedures. For example, the admin system 110 may operate on a Linux machine, while the computing environment 118-1 may operate as part of an Oracle® database system, and the developer system 102 may run Microsoft Windows®.

The embodiments described herein provide for an update tool that allows a system administrator to log in once to the update tool, which in turn automatically logs the system administrator into any of the other systems involved in the patching process. Interface 500 provides one method for providing login credentials to establish the patching session. While the username and password are used here by way of example, it will be understood that the credentials provided by the system administrator may include any identifying information, such as a hardware dongle, encryption keys, biometric information, and/or the like. Some embodiments of interface 500 may also include a remote location that can be specifically accessed by the login procedure. Adding a time zone to the patch process may be required to timestamp the logs, backups and customizations accurately.

Some embodiments may auto populate all of the information fields in interface 500. This may require user information and credentials to be stored locally on the admin system running the update tool. In order to provide security, it may be beneficial to provide a means by which the user credentials can be encrypted and saved locally.

Figure 6:
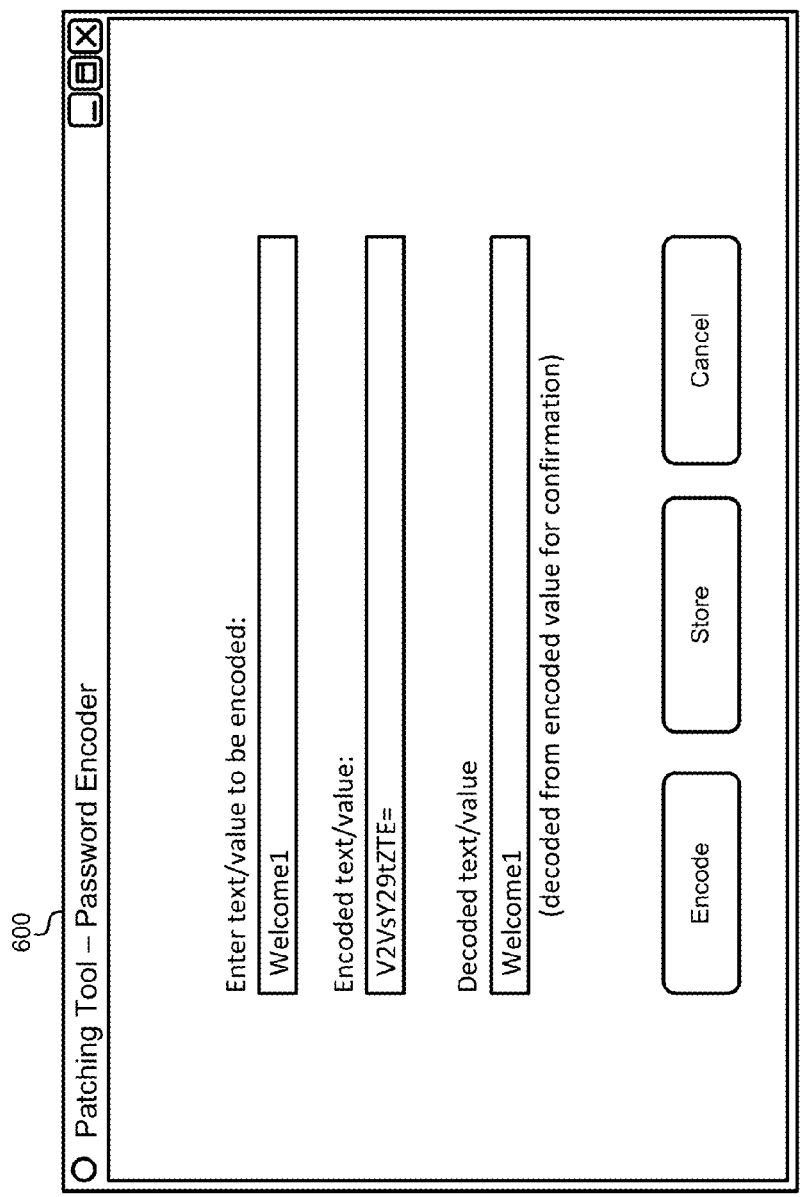
FIG. 6 illustrates an interface for encrypting and storing login credentials for future use, according to one embodiment.

FIG. 6 illustrates an interface for encrypting and storing login credentials for future use, according to one embodiment. Interface 600 provides a tool by which a password can be custom encrypted within a profile and stored locally. Encryption and decryption can happen at runtime as the update tool is processing patch requests. As part of a user profile, a system administrator can select a particular encryption techniques to use, as well as seed sources, key lengths, and/or the like. Interface 600 allows the user to test the encryption method for encoding a password. For example, a user can enter a password or test string and see the text value as it is encoded by the selected encryption technique. Simultaneously, the decoded text can be displayed for the user, and the user can verify that the entered text and decoded text are equivalent. This allows the password to be stored as a text string in an encrypted form in a file local to the update tool. This also allows multiple system administrators to share the same update tool for patching different computing environments.

Figure 7:
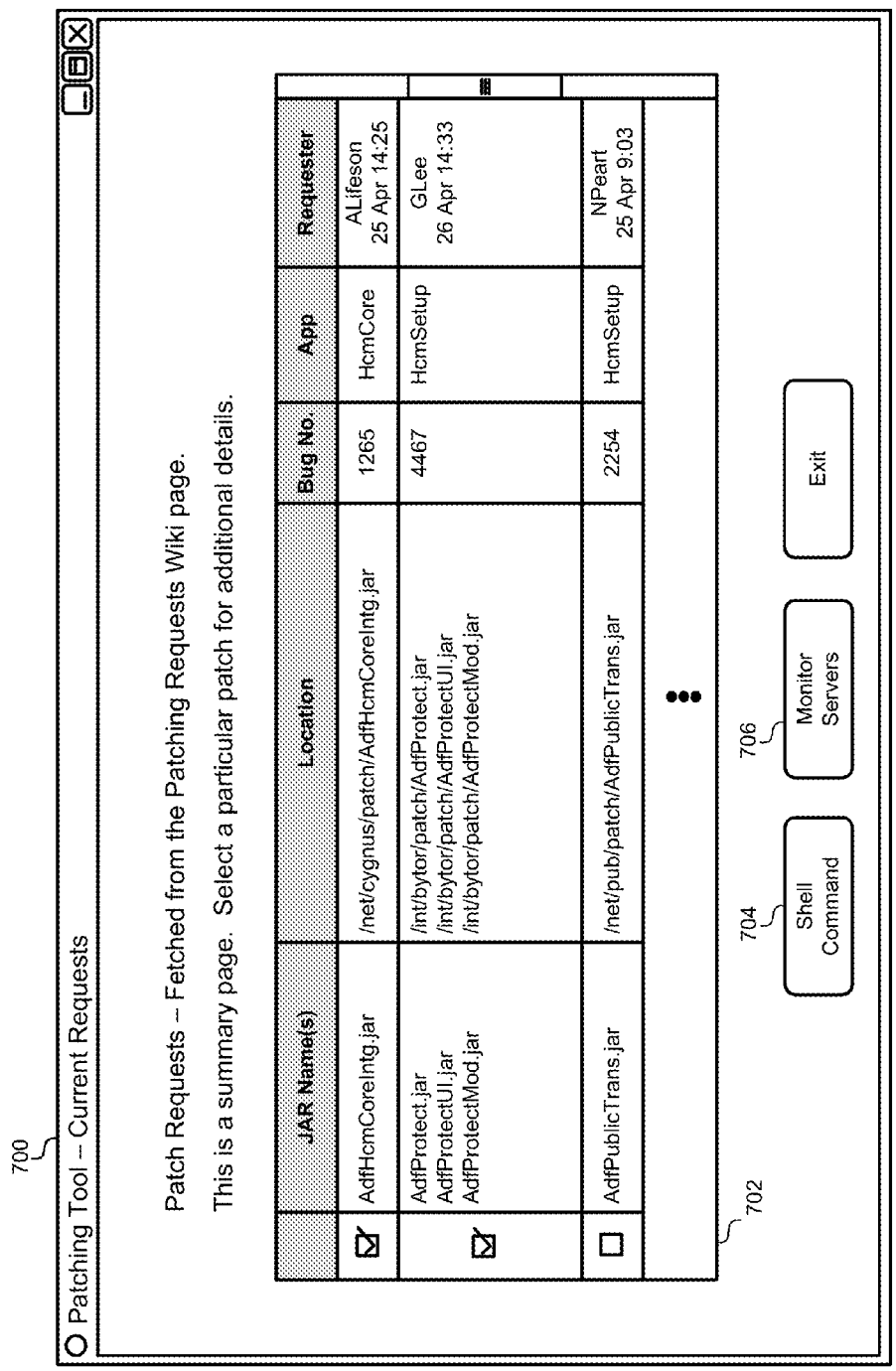
FIG. 7 illustrates an interface for selecting patch requests related to a selected computing environment, according to one embodiment.

FIG. 7 illustrates an interface 700 for selecting patch requests related to a selected computing environment, according to one embodiment. The patching tool may interrogate the webpage and retrieve any patch requests that are related to the selected computing environment. Each of the patch requests can be loaded into a preview table 702 and displayed as part of interface 700. The system administrator can review the summary page and validate the request details associated with each patch request. If any changes need to be made to the patch request prior to generating and executing patch command scripts, the system administrator can select a particular patch request for editing. Additionally, a system administrator can specify particular patches to be executed as part of the patching process. For example, the system administrator may determine that one or more patches are not yet ready to be installed and "uncheck" these patch requests in the preview table 702.

The preview table 702 displayed by interface 700 may also provide a launching point for moving on to subsequent phases of the patching process. For example a control 706 allows the system administrator to monitor various servers that may be affected by one or more of the selected patches in the preview table 702. Additionally, a control 704 allows the system administrator to begin the process of generating and/or executing patch command scripts. Each of these two operations will be described in greater detail below.

Figure 8:
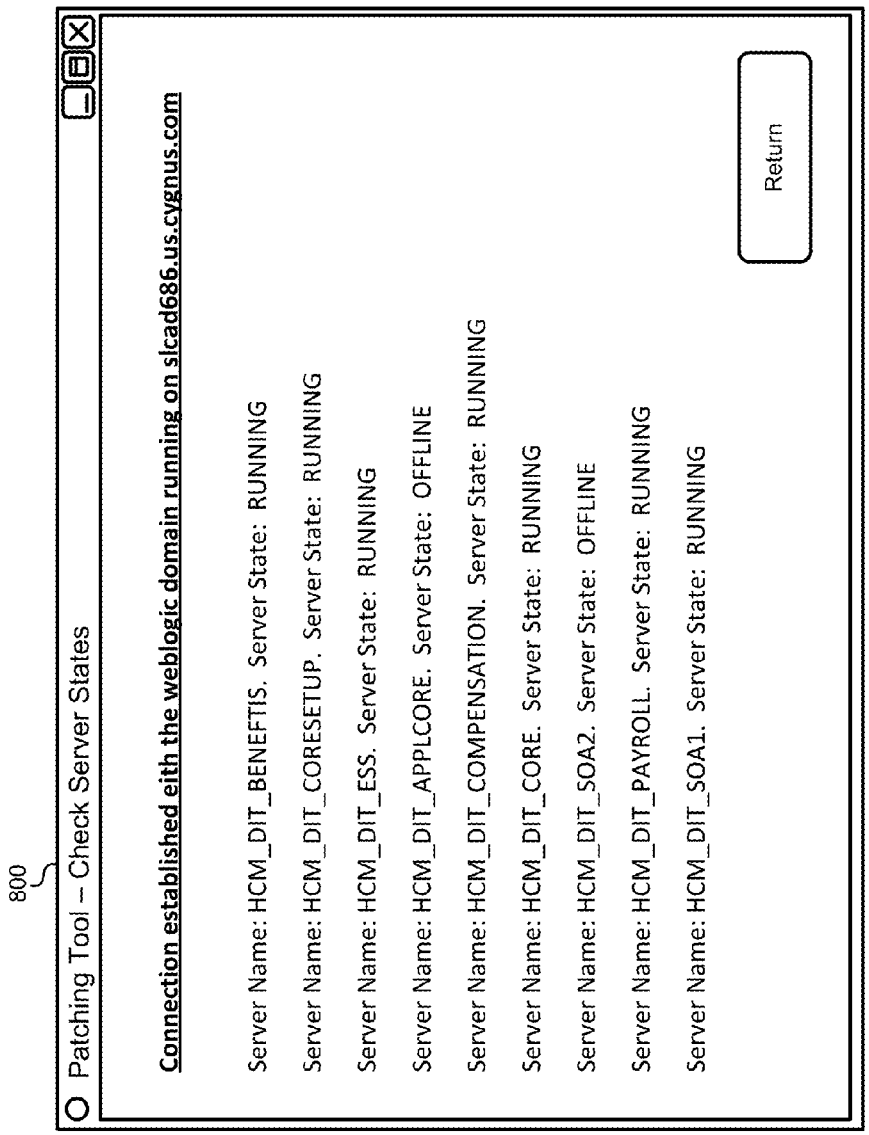
FIG. 8 illustrates an interface for checking server statuses, according to one embodiment.

FIG. 8 illustrates an interface 800 for checking server statuses, according to one embodiment. Prior to installing patches, it may be beneficial to know the status of the servers in the computing environment where the patches will be installed. From interface 700, the system administrator may select control 706 to display interface 800. Interface 800 can establish a connection to a web logic domain and fetch the status and operating details of any server in the computing environment. In some embodiments, the update tool can analyze the selected patches to be installed in the computing environment, and query each of the servers affected by the selected patches. Other embodiments can show the state of each server in the computing environment that has been selected. The update tool can log the system administrator into each of the servers using the stored credentials described above.

Figure 9:
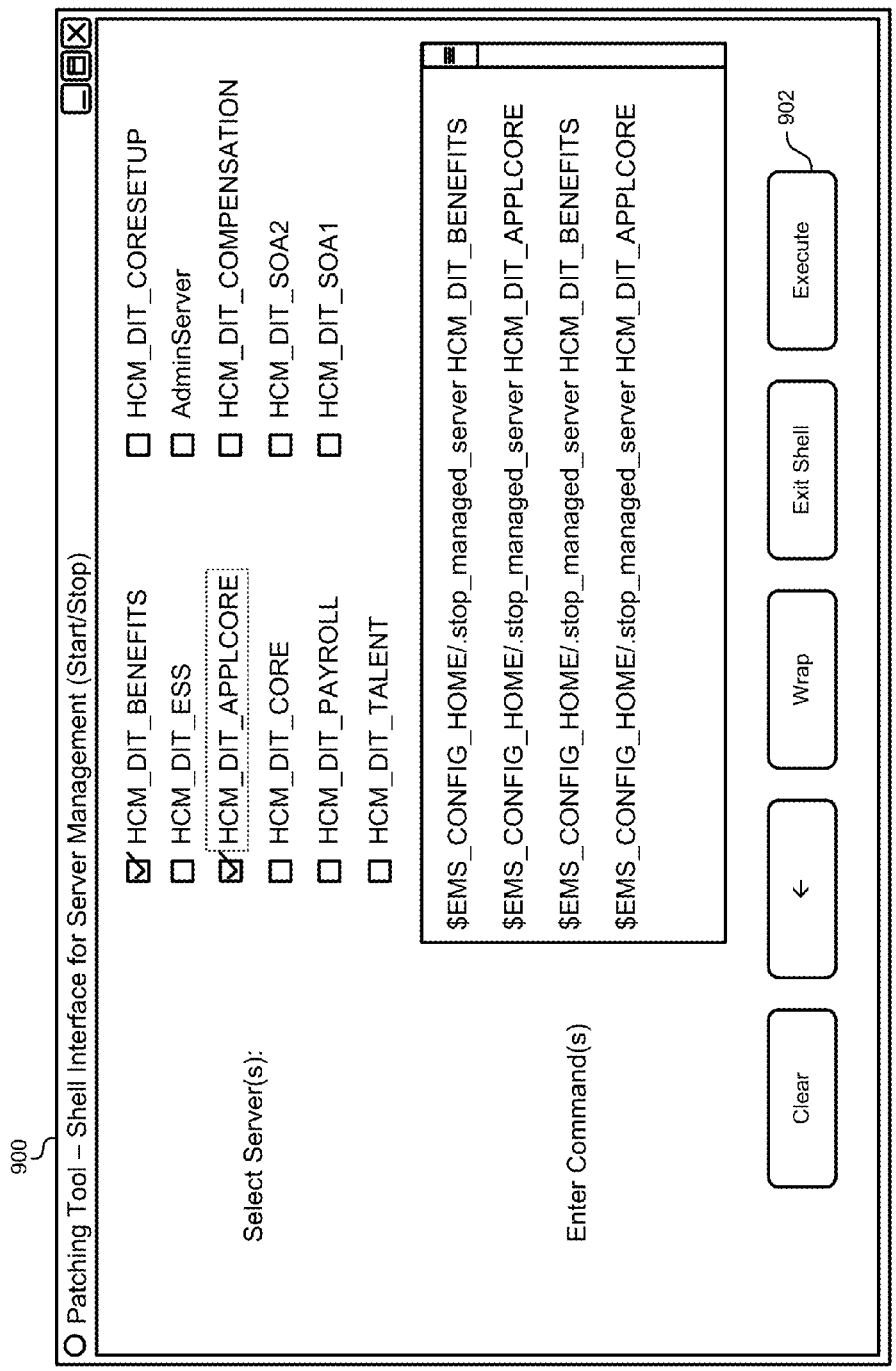
FIG. 9 illustrates an interface for bouncing selected servers, according to one embodiment.

FIG. 9 illustrates an interface 900 for bouncing selected servers, according to one embodiment. Interface 900 can be populated automatically with a set of servers that are affected by the patching process. The list of servers need not be hardcoded into the interface, and instead the names of the servers can be automatically fetched by the update tool by establishing a connection with the computing environment. The system administrator can select the servers that they would like to stop/start and a set of stop/start commands can be automatically generated in the command window. The system administrator can then see the commands generated in the text box of interface 900. After examination, the system administrator can then edit or write their own commands to be executed when the execute control 902 is selected. When control 902 is selected, the output can appear as a console-like pop-up window that displays a log-style listing of commands and responses from the servers being bounced.

FIG. 10 illustrates an interface 1000 for generating command scripts and executing patch processes, according to one embodiment. Interface 1000 can be generated for each patch to be applied to the computing environment. By way of example, interface 1000 illustrates a Java environment where patches are applied by replacing existing .JAR files with new .JAR files. However, it will be understood that any software module or patch type could be applied using interface 1000. Interface 1000 serves as a final check for a system administrator to look over the details of the patching operation before executing the patch process and backing up the existing system.

Interface 1000 will include a name of the .JAR file to be replaced, a source path for the .JAR file, and a control 1002 that allows the system administrator to check the access path to the source file to ensure that it is available and correct. Interface 1000 also includes a control 1004 that will display other same or similar .JARS in the computing environment. Sometimes the patch is only scheduled to be installed within certain applications of the computing environment. Control 1004 provides a way for a system administrator to be alerted to the fact that additional applications in the selected computing environment may also benefit from installing the patch. The system administrator can select any of the additional .JAR files found by the update tool for inclusion in the patching process. As these additional software modules are selected, they can be added to the control 1006 indicating the destination .JAR paths.

Interface 1000 can also display the bug number associated with the particular patch. After executing the patching process, the bug number can be automatically updated in IT system as being resolved. Some patches may be associated with multiple bugs, and the system administrator can select one or all of the bugs to resolve. Other user customizations are available, such as manually entering user-defined paths, allowing multiple destinations for the .JAR file as described above in relation to control 1004, and a final checkbox that allows the system administrator to manually confirm that the paths and steps of the patching process have been verified and are ready to execute. By selecting control 1008, the system administrator can back up the existing software module and execute the patching process. When a process is complete, the system administrator can select control 1010 to move to the next patch in the list of selected patch requests.

In addition to allowing the system administrator to validate the details of interface 1000, the update tool can also analyze historical patching patterns and alert the system administrator to detected variations prior to executing the patch process. For example, the update tool can recognize new source/destination paths that are outside of the normal pattern of patch usage. The system administrator can be alerted to any aspects of the patch request that are outside of a normal pattern of usage. This may provide an additional safeguard prior to executing a patch process.

When the system administrator selects control 1008, a patch command script can be generated by the update tool that utilizes the source/destination paths, the backup path for the computing environment, and any other details from the configuration and/or patch request that may be required to automatically execute the patching process. For example, the update tool may generate a sequence of shell commands that can be executed sequentially by one or more of the computer systems involved in the patch and backup process. Part of the patching process involves generating a log file that records the commands executed and any resulting status indications provided from the computer systems affected by the patch. For example, the log file may store an indication that a backup copy of an old .JAR file was correctly stored to a backup location is defined in the configuration of the computing environment. Each operation and/or backup file can include a filename that is appended with a timestamp indicating when the operation was completed.

Although not shown explicitly, after selecting control 1008 to backup the existing software module and apply the patch, a pop-up window may be displayed as an interface to indicate a status and completion of the patch process. In some embodiments, this interface can include information such as the location of the log file, some or all of the contents of the log file, a final status indicator of success or failure for the patch, any warnings and/or errors encountered during the patching process, and/or the like. This summary interface can be displayed after each patch is applied and can be dismissed by the system administrator prior to applying the next patch. Alternatively or additionally, a summary interface can be displayed when all of the patches have been applied to the selected computing environment.

As described by way of the interfaces listed above, the update tool provides an automated system for fetching and analyzing patch requests. It is capable of parsing patch requests from a central location (e.g. webpage), fetching details for each of the patch requests, and populating interfaces automatically. The update tool is also capable of establishing connections to remote servers running commands required for the patching process without forcing the user to manually log into each computing environment or server. The interfaces described above are dynamic and can be built incrementally as the system administrator navigates through each successive interface. Thus, the GUI may be dependent on user inputs and the nature of the patching requests being serviced.

Figure 11:
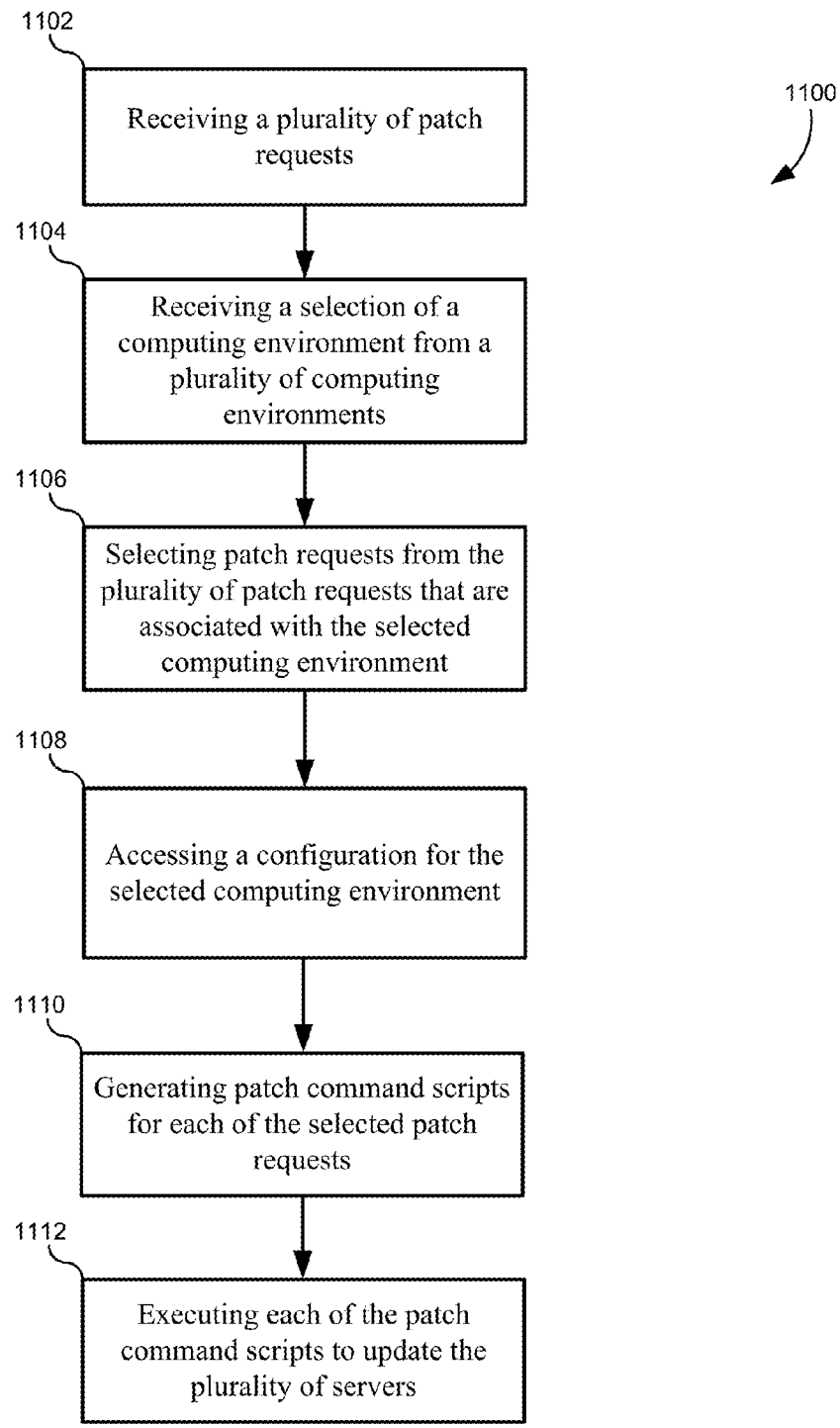
FIG. 11 illustrates a flowchart of a method for automatically applying patch processes to a selected computing environment, according to one embodiment.

FIG. 11 illustrates a flowchart 1100 of a method for automatically applying patch processes to a selected computing environment, according to one embodiment. The method may include receiving a plurality of patch requests (1102). The patch requests may be received by an update tool from a repository for storing the patch requests, such as the webpage or wiki described above. The patch requests may also be received from local data store when the update tool itself stores and receives patch requests from developers. A patch request may include a location of the patch, and instructions as to how to apply the patch to various applications and/or computing environments. Along with the patch requests, the update tool may receive user credentials from an administrator, and the user credentials can be used to log into a plurality of computers that are involved in executing the patching process. These user credentials may be encrypted and the encrypted user credentials can be stored locally on the computer system. The update tool can automatically decrypt and use the user credentials during subsequent patch sessions.

The method may also include receiving a selection of a computing environment from a plurality of computing environments (1104). In some embodiments, one or more of the plurality of computing environments may include portions of an Enterprise Software System. The method may additionally include selecting patch requests from the plurality of patch requests that are associated with the selected computing environment (1106). The update tool may automatically analyze the plurality of patch requests received from various developers and select those patch requests that can be executed in the selected computing environment. In some embodiments, the patch request themselves may indicate which computing environment they should be associated with. Some embodiments may also receive the patch request and query each of the plurality of computing environments to determine which of the computing environments should be updated by the patch.

The method may further include accessing a configuration for the selected computing environment (1108). The configuration may include paths for each of the software modules and/or applications in the computing environment, as well as instructions or indications for backing up existing software modules affected by the patch. The method may also include generating patch command scripts for each of the selected patch requests (1110). In some embodiments, the patch command scripts may be generated based on the configuration of the selected computing environment (e.g. destination paths), and/or the respective selected patch request (e.g. source paths for the patch software module(s)). These patch command scripts may then be executed automatically by the update tool.

It should be appreciated that the specific steps illustrated in FIG. 11 provide particular methods of applying patches according to various embodiments of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 12:
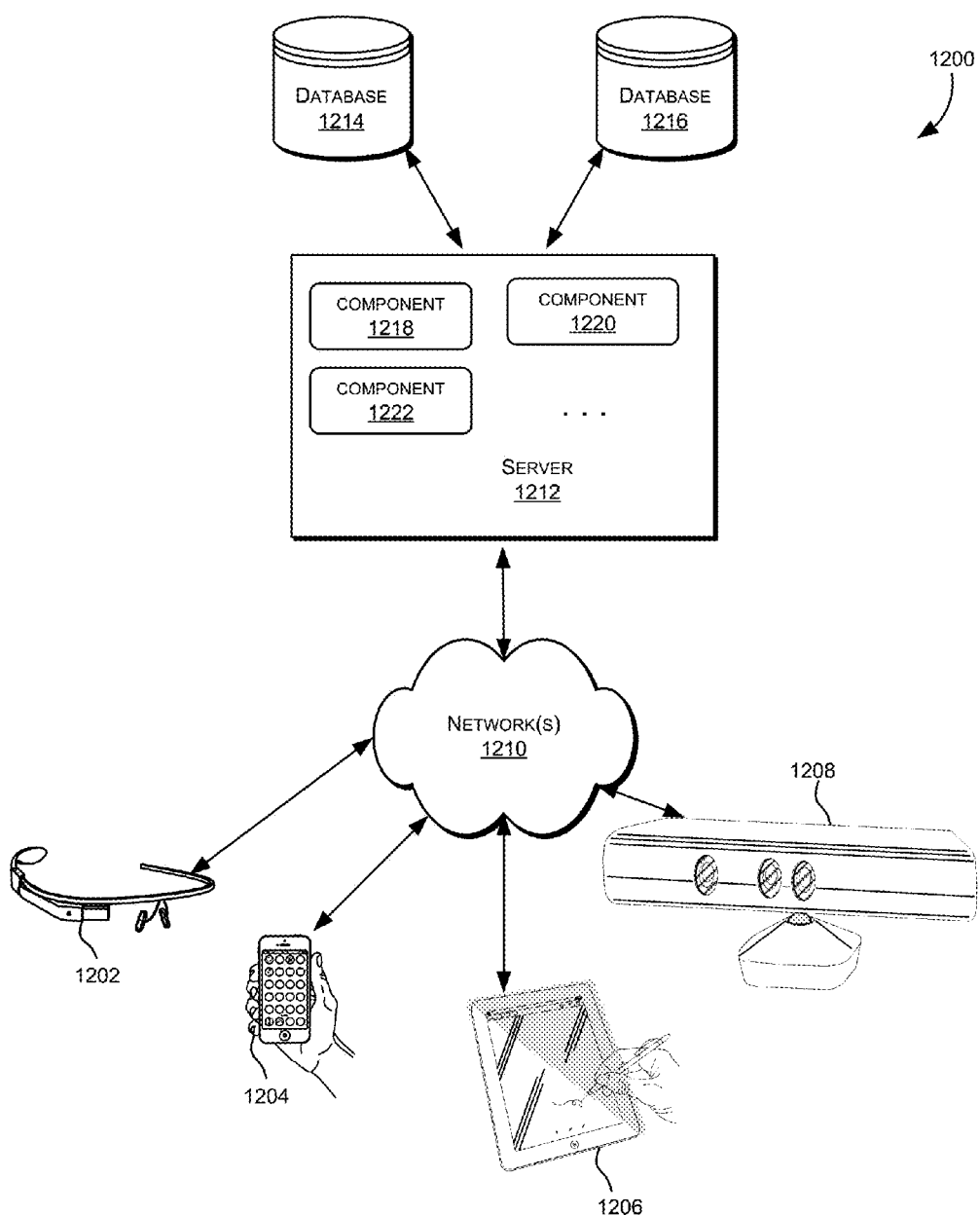
FIG. 12 illustrates a simplified block diagram of a distributed system for implementing some of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
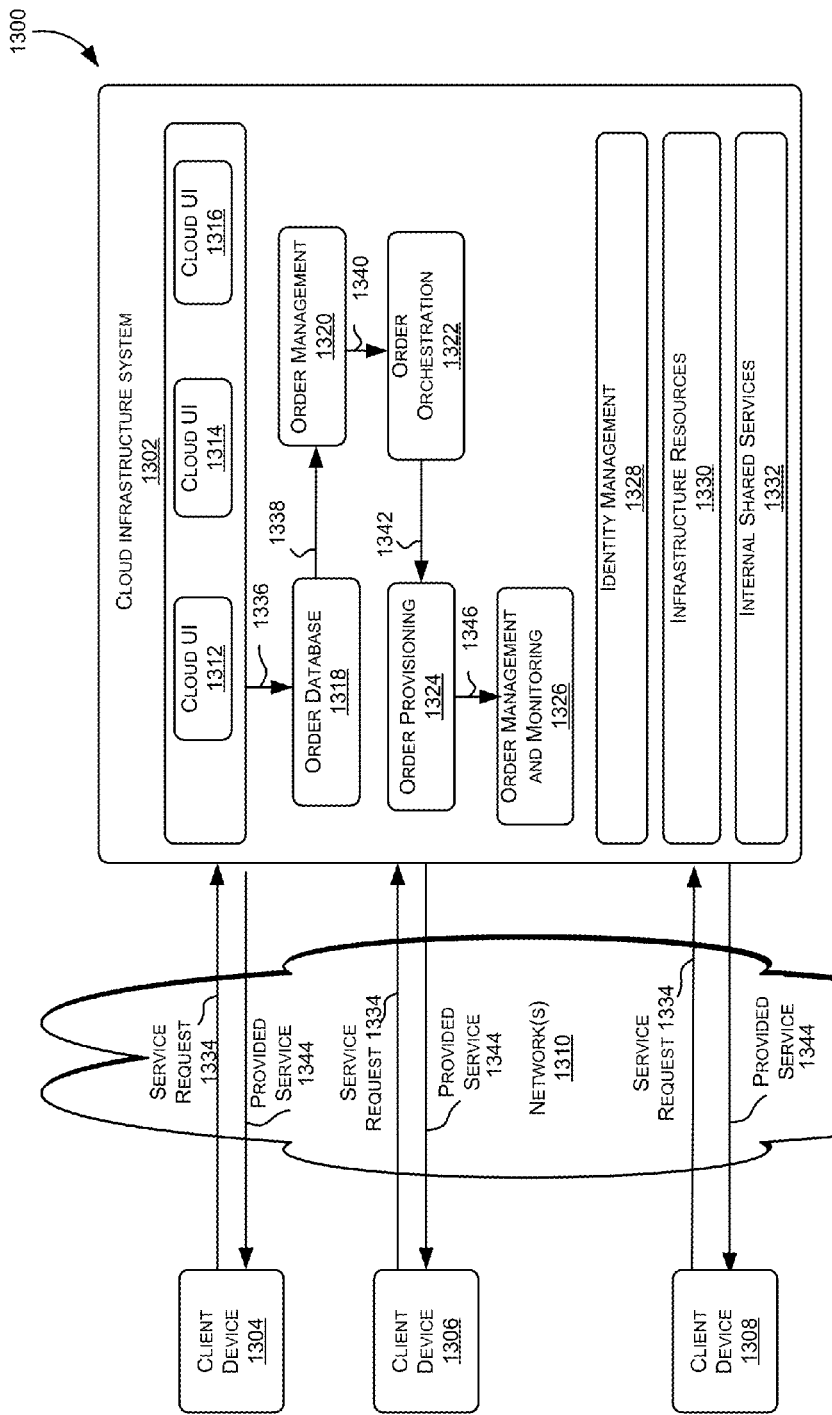
FIG. 13 illustrates a simplified block diagram of components of a system environment by which services provided by the components of an embodiment system may be offered as cloud services.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system

1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order.

Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
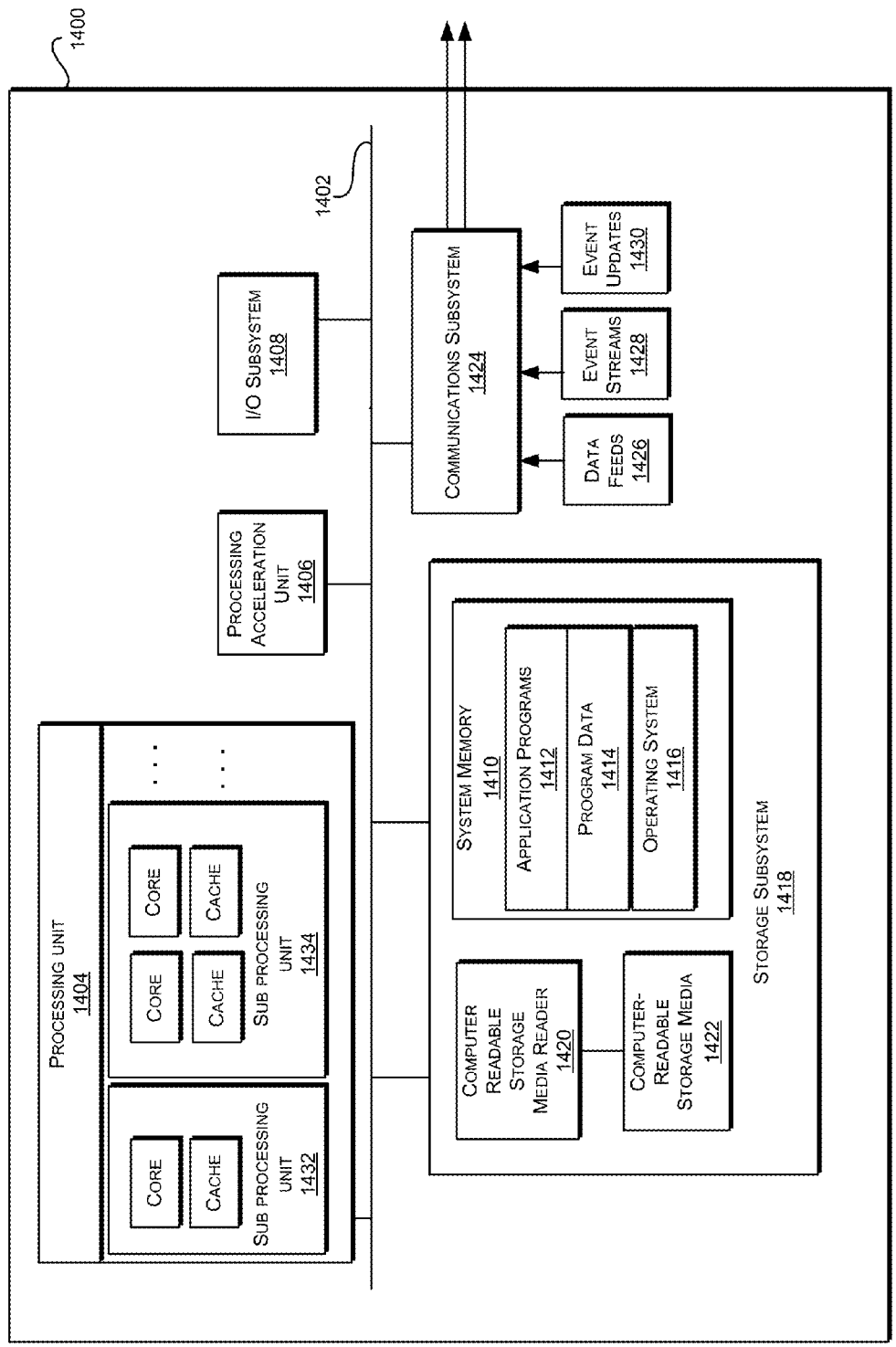
FIG. 14 illustrates an exemplary computer system, in which various embodiments may be implemented.

FIG. 14 illustrates an exemplary computer system 1400, in which various embodiments of the present invention may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of updating a plurality of servers, the method comprising:
   receiving, by a computer system, a plurality of patch requests;
   receiving, by the computer system, a selection of a computing environment from a plurality of computing environments, wherein the selected computing environment comprises a plurality of servers;
   determining a plurality of software applications operating on the plurality of servers in the first computing environment;
   selecting, by the computer system, patch requests from the plurality of patch requests that are associated with the plurality of software applications operating in the selected computing environment;
   accessing, by the computer system, a configuration for the selected computing environment;
   generating, by the computer system, and in response to receiving the selection of the computing environment, patch command scripts for each of the selected patch requests, wherein the patch command scripts comprise information copied from the configuration of the selected computing environment;
   causing, by the computer system, each of the plurality of servers in the selected computing environment to stop execution;
   executing, by the computer system, each of the patch command scripts on the selected computing environment while the plurality of servers have stopped execution; and
   causing, by the computer system, each of the plurality of servers in the selected computing environment to restart execution after each of the patch command scripts have been executed.

2. The method of claim 1, further comprising:
   selecting, by the computer system, a first patch request from the selected patch requests, wherein the first patch request replaces a software module present in a first application running in the selected computing environment;
   determining, by the computer system, additional applications in the selected computing environment that also include the software module;
   automatically, by the computer system, generating additional patch command scripts for the first patch request, wherein the additional patch command scripts target the additional applications in the selected computing environment; and
   executing each of the additional patch command scripts to update the plurality of servers.

3. The method of claim 1, further comprising:
   querying, by the computer system, each of the plurality of servers to determine a server status for each of the plurality of servers prior to executing each of the patch command scripts to update the plurality of servers.

4. The method of claim 1, wherein the selected computing environment comprises web services within an Enterprise Software System.

5. The method of claim 1, further comprising:
   recording, by the computer system, over time, a pattern of patch requests for the selected computing environment;
   determining, by the computer system, that a first patch request in the selected patch requests deviates from the pattern of patch requests for the selected computing environment; and
   automatically changing, by the computer system, a patch command script to be consistent with the pattern of patch requests instead of the first patch request.

6. The method of claim 1, further comprising:
   receiving, by the computer system, user credentials from an administrator; and
   logging, by the computer system, into a plurality of computers using the user credentials, wherein the plurality of computers are involved in executing the patch command scripts.

7. The method of claim 6, further comprising:
encrypting, by the computer system, the user credentials;
storing, by the computer system, the encrypted user credentials locally on the computer system; and
automatically decrypting, by the computer system, and using the user credentials during a subsequent patch session.

8. The method of claim 1, further comprising:
identifying, by the computer system, software modules in the selected computing environment that will be affected by the execution of the patch command scripts; and
saving, by the computer system, a copy of each of the software modules prior to executing each of the patch command scripts.

9. The method of claim 8, wherein the copy of each of the software modules includes a timestamp indicating when the software module was affected by the execution of the patch command scripts.

10. The method of claim 1, further comprising writing, by the computer system, details associated with the execution of each of the patch command scripts to a log file.

11. The method of claim 1, wherein each of the plurality of patch requests is associated with a .JAR file to be replaced in applications running in the selected computing environment.

12. The method of claim 1, wherein the configuration comprises:
paths for software modules that are affected by the patch command scripts; and
a path for a backup storage location.

13. A non-transitory computer-readable medium comprising instructions which, when executed by one or more processors, causes the one or more processors to perform operations comprising:
receiving a plurality of patch requests;
receiving a selection of a computing environment from a plurality of computing environments, wherein the selected computing environment comprises a plurality of servers;
determining a plurality of software applications operating on the plurality of servers in the first computing environment;
selecting patch requests from the plurality of patch requests that are associated with the plurality of software applications operating in the selected computing environment;
accessing a configuration for the selected computing environment;
generating, in response to receiving the selection of the computing environment, patch command scripts for each of the selected patch requests, wherein the patch command scripts comprise information copied from the configuration of the selected computing environment;
causing each of the plurality of servers in the selected computing environment to stop execution;
executing each of the patch command scripts on the selected computing environment while the plurality of servers have stopped execution; and
causing each of the plurality of servers in the selected computing environment to restart execution after each of the patch command scripts have been executed.

14. The non-transitory computer-readable medium according to claim 13 wherein the instructions cause the one or more processors to perform additional operations comprising:
selecting a first patch request from the selected patch requests, wherein the first patch request replaces a software module present in a first application running in the selected computing environment;
determining additional applications in the selected computing environment that also include the software module;
automatically generating additional patch command scripts for the first patch request, wherein the additional patch command scripts target the additional applications in the selected computing environment; and
executing each of the additional patch command scripts to update the plurality of servers.

15. The non-transitory computer-readable medium according to claim 13 wherein the instructions cause the one or more processors to perform additional operations comprising:
recording, over time, a pattern of patch requests for the selected computing environment;
determining that a first patch request in the selected patch requests deviates from the pattern of patch requests for the selected computing environment; and
automatically changing a first patch command script to be consistent with the pattern of patch requests instead of the first patch request.

16. The non-transitory computer-readable medium according to claim 13 wherein the instructions cause the one or more processors to perform additional operations comprising:
identifying software modules in the selected computing environment that will be affected by the execution of the patch command scripts; and
saving a copy of each of the software modules prior to executing each of the patch command scripts.

17. The non-transitory computer-readable medium according to claim 13 wherein the configuration comprises:
paths for software modules that are affected by the patch command scripts; and
a path for a backup storage location.

18. A system comprising:
one or more processors; and
one or more memory devices comprising instructions which, when executed by the one or more processors, cause the one or more processors to perform operations comprising:
receiving a plurality of patch requests;
receiving a selection of a computing environment from a plurality of computing environments, wherein the selected computing environment comprises a plurality of servers;
determining a plurality of software applications operating on the plurality of servers in the first computing environment;
selecting patch requests from the plurality of patch requests that are associated with the plurality of software applications operating in the selected computing environment;
accessing a configuration for the selected computing environment;
generating, in response to receiving the selection of the computing environment, patch command scripts for each of the selected patch requests, wherein the patch command scripts comprise information copied from the configuration of the selected computing environment;
causing each of the plurality of servers in the selected computing environment to stop execution;

executing each of the patch command scripts on the selected computing environment while the plurality of servers have stopped execution; and causing each of the plurality of servers in the selected computing environment to restart execution after each of the patch command scripts have been executed.

19. The system of claim 18 wherein the instructions further cause the one or more processors to perform additional operations comprising:

selecting a first patch request from the selected patch requests, wherein the first patch request replaces a software module present in a first application running in the selected computing environment;

determining additional applications in the selected computing environment that also include the software module;

automatically generating additional patch command scripts for the first patch request, wherein the additional patch command scripts target the additional applications in the selected computing environment; and executing each of the additional patch command scripts to update the plurality of servers.

20. The system of claim 18 wherein the instructions further cause the one or more processors to perform additional operations comprising:

recording, over time, a pattern of patch requests for the selected computing environment;

determining that a first patch request in the selected patch requests deviates from the pattern of patch requests for the selected computing environment; and automatically changing a first patch command script to be consistent with the pattern of patch requests instead of the first patch request.

* * * * *